April 23, 1957 — E. C. PROCTER — 2,789,826

CHUCK

Filed Sept. 11, 1953

INVENTOR
Edward C. Procter
By Richard E. Babcock Jr.
ATTORNEY

United States Patent Office 2,789,826
Patented Apr. 23, 1957

2,789,826

CHUCK

Edward C. Procter, New Holland, Pa., assignor, by mesne assignments, to Sperry Rand Corporation, New Holland, Pa., a corporation of Delaware Application September 11, 1953, Serial No. 379,495

2 Claims. (Cl. 279—87)

This invention relates to a chuck or tool holder of the type which employs a wedge mechanism for securing articles therein.

It is a primary object of the invention to provide a simplified chuck construction in which the wedge mechanism and preferably also its actuating means are insertible into the chuck sleeve through the same opening which receives the article to be engaged and held by the wedge, the actuating means then being operatively disposed to one side of and closely adjacent said opening for ready accessibility.

It is a further object to provide such a chuck in which the wedge and its actuating means may be preassembled and then applied as a unit to the chuck to be then held in operative position by cooperation with an article held in the chuck.

Also, it is an object of the invention to utilize the wedge element as one of a trio of radially inwardly projecting clamp ribs for engaging cylindrical articles of varying diameters at relatively circumferentially spaced points around the exterior cylindrical surface of such members, to thus firmly hold such members or articles against displacement in any direction.

Figure 1:
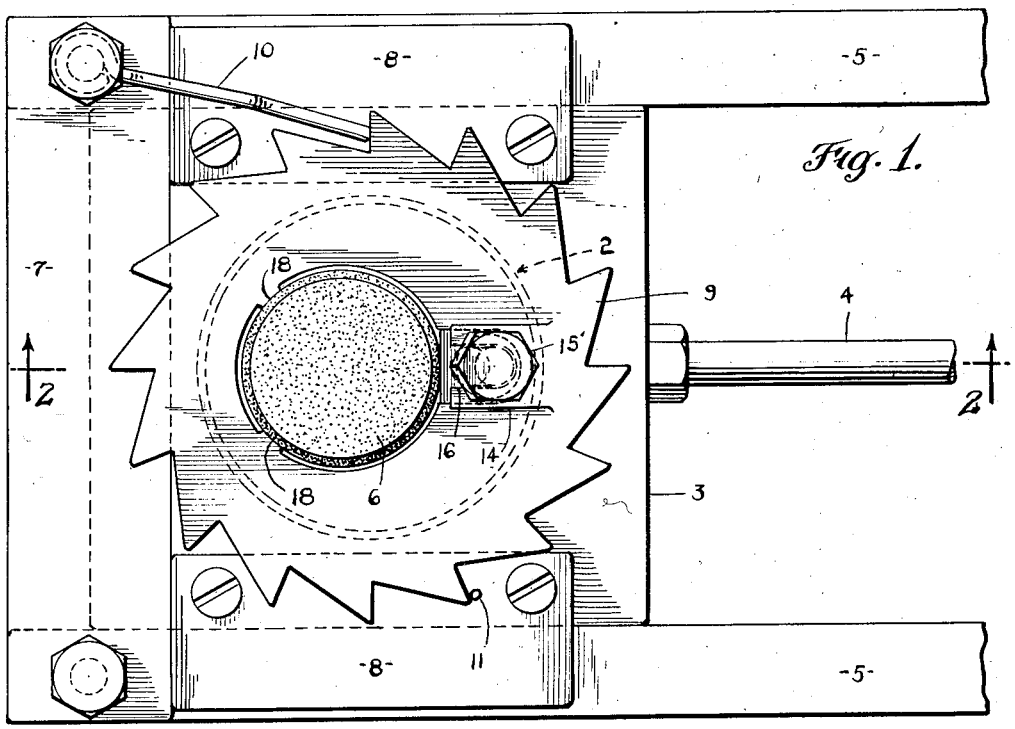
Figure 2:
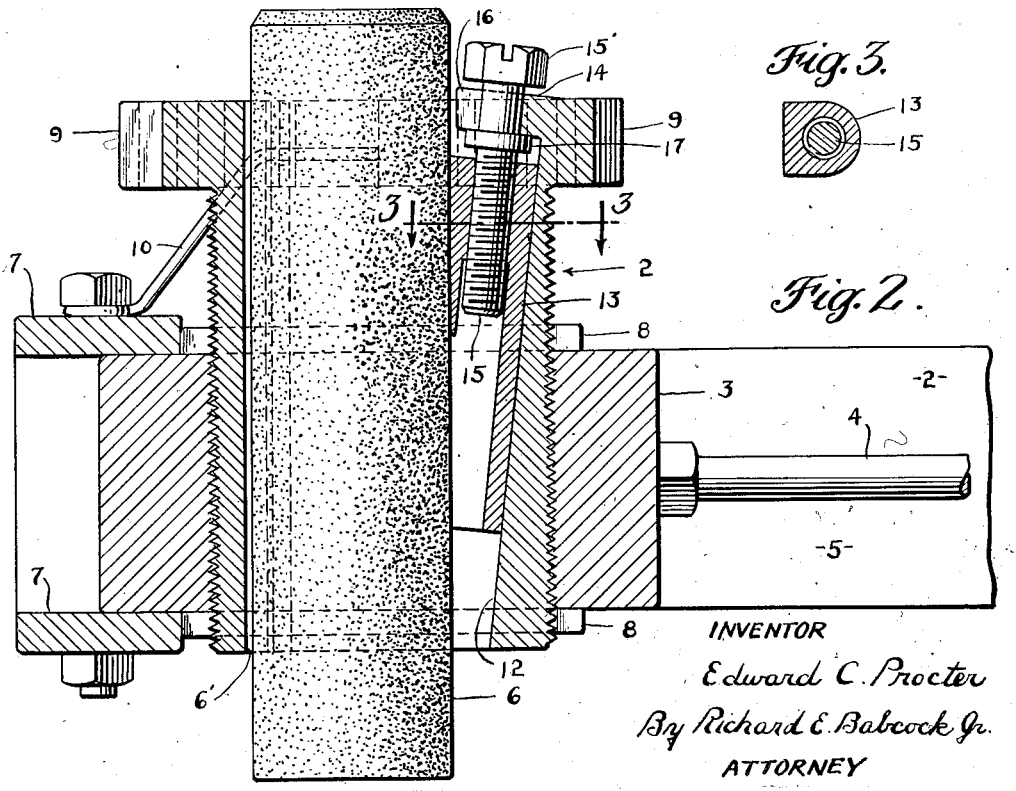

The preferred embodiment of the invention attaining the foregoing as well as other incidental objects and advantages is illustrated in the accompanying drawing in which:

Figure 1 discloses a plan view of a portion of a sharpening mechanism in which a chuck in accordance with the invention is supported by a carriage for movement along a set of guide rails or tracks so that a sharpening stone or other tool carried by the chuck may be traversed across a rotating cutter head or the like to sharpen the knives thereof;

Figure 2, a cross-section on the line 2—2 of Figure 1; and

Figure 3:
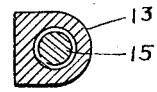

Figure 3, a detail cross-section on the line 3—3 of Figure 2.

Referring now in detail to the accompanying drawings, I have there shown the preferred form of chuck of the invention in its preferred use as one of the elements of a sharpening mechanism in which the chuck 2 is in the form of an externally threaded sleeve threadedly received in a slide 3 having a manually engageable operating handle 4 whereby it may be reciprocated back and forth on the parallel tracks 5—5. The arrangement is such that a cylindrical sharpening stone 6 supported within the chuck 2 has its lower operative axial end traversed back and forth over a suitable rotating work piece or element such as a rotary cutter head or reel, not shown, having knives disposed for engagement by the stone 6. It will be understood that the tracks, or track ways, 5—5 will be suitably positioned substantially parallel to the surface generated by the edges of the rotating cutter head knives in accordance with usual practice. Also it will be seen that the relatively spaced tracks 5—5 are interconnected at their ends by connecting members such as 7. The slide 3, slidably disposed between these tracks is vertically supported on guide plates 8—8 fixed on each side of the slide 3 and projecting laterally above and below the associated tracks 5 into overlappnig sliding relationship therewith.

Inasmuch as the sharpening stone 6 will be gradually worn away in an endwise direction by virtue of its contact with the rotating knives or other work pieces it is desirable to have means for progressively feeding such stone toward the work. Such means may assume the form of a ratchet wheel 9 fixed concentrically on the chuck 2 at its upper end above the slide 3 for cooperation with a projecting spring arm or pawl 10 as the slide or carriage 3 approaches the left hand end of each reciprocative stroke, as determined by engagement between the supporting plates 8 and the connecting end pieces 7. A suitable holding pawl 11, which may be in the form of a laterally deflectible spring arm fixed on and projecting vertically upwardly from one of the plates 8, cooperates with the ratchet wheel 9 to prevent retrogressive rotational movement thereof responsive to the drag of the actuating pawl 10 on the ratchet teeth during the return reciprocating stroke.

The mechanism as thus far described constitutes no part of my invention, being the subject matter of a patent application filed by J. R. West et al., Serial No. 328,661, on December 30, 1952, now Patent No. 2,735,-298, issued February 21, 1956, but is thus briefly referred to merely in order to afford a proper understanding of the preferred background and use of the invention.

In the above described mechanism, it will be seen that each time the slide 3 is reciprocated the chuck 2 will be partially rotated by the coaction of the ratchet wheel 9 and pawl 10 to thus progressively feed the sharpening stone 6 toward the work piece by virtue of the threaded coaction between the sleeve or chuck element 2 and the slide 3. When the chuck 2 has been fed through the slide 3 to the full extent permitted by their threaded interconnection it is desirable to retract the same manually and reposition the stone 6 downwardly in the chuck whereby the latter may be automatically adjusted through a further range of feeding movement as aforementioned.

The instant invention embodies a novel wedge type mechanism for initially positioning the stone 6 in the chuck 2 and for periodically resetting or adjusting its position therein as required to take up for wear. To this end, the chuck 2 is in the form of a tubular preferably cylindrical sleeve formed interiorily with a trackway 12 which is laterally offset from the main tubular or cylindrical passage way through said chuck. This trackway 12 of course communicates with the main cylindrical bore or passageway 6' through the chuck and is inclined relatively to the longitudinal axis of the bore 6' in a common plane with the axis.

Disposed for movement in said trackway 12 into wedging engagement with a sharpening stone 6 or other article positioned in the bore 6' is a wedge or slide 13. Fixed interiorily of the sleeve 2 in alignment with the upper end of the trackway 12 is an abutment 14 adapted for abutting engagement with an adjusting screw element 15 threaded into the upper end of the wedge 13 parallel to the movement thereof.

In the preferred embodiment of the invention the abutment 14 is formed with a slot 16 aligned with the threaded element 15 to slidably and rotatably receive same and opening radially inwardly toward the tool or stone 6 so that upon removal of the latter from the bore or socket 6' the wedge 13 and its actuating screw 15 may both be removed as a unit by displacing the screw 15 laterally out of the open end of the slot 16, whereupon both the wedge 13 and screw 15 in their assembled relation may be withdrawn from the chuck 2 through the bore or socket 6'. These elements 13 and 15 may be similarly assembled and inserted as a unit into the socket 6' thence laterally into the slot 16 and trackway 12 during the assembly of the chuck mechanism to be subsequently held in their operative positions as in Figure 2 by the application of a sharpening stone or other tool or article within the socket 6'. It will be seen that the threaded element or screw 15 is provided with a suitable radial projection or collar 17 for rotary engagement beneath the underface of the abutment 14, thus to provide a surface whereby the rotation of the screw 15 may urge the wedge 13 downwardly in the trackway 12 and thus radially into tight wedging relation with the stone 6. The head 15' of the screw 15 preferably projects upwardly above the abutment 14 and exteriorly of the chuck 2 whereby it may be easily engaged and rotated by a usual wrench or other tool to actuate the wedge 13 as desired. Preferably that portion of the element 15 between the head 15' and collar 17 is of smooth unthreaded configuration to facilitate its reception and rotation within the slot 16 of abutment 14.

It will thus be seen that a chuck constructed in accordance with the present invention embodies but a minimum of number of parts which may be easily formed and assembled, the resulting structure requiring no special openings or other provisions for permitting insertion of the wedge 13 within the chuck body, and the head of the adjusting screw 15 in the resulting structure being conveniently and accessibly disposed exteriorly of the chuck 2. Also, the ease of assembly is greatly facilitated by virtue of the ability to preassemble the wedge 3 and its actuating screw 15 whereby same may be inserted as a complete unit in operative relation within the chuck 2.

Moreover in accordance with a further feature of the invention it will be seen that the chuck 2 in the preferred embodiment is provided with a pair of fixed relatively spaced inwardly projecting ribs 18—18 extending parallel to the major longitudinal axis of the socket 6' of the sleeve or chuck 2 and that the wedge 13, which is substantially opposed to the ribs 18—18, similarly has an inwardly projecting surface, as shown, parallel to the major axis of the socket 6' and hence to the ribs 18—18 to operate with said ribs 18—18 in engaging and holding sharpening stones or other cylindrical articles of varying diameters within the chuck 2.

In the application, I have shown and described only the preferred embodiment of my invention simply by way of illustrating the preferred mode of carrying out my invention as required by the patent laws. However, I recognize that the invention is capable of other and different embodiments and that its several details may be modified in various ways. Accordingly, the foregoing description and drawings are to be construed as merely illustrative in nature and are not intended to limit the scope of the invention otherwise than as required by the following claims.

Having thus described my invention, I claim:

1. A chuck comprising a generally cylindrical sleeve formed with an axially inclined trackway in a radial plane of the sleeve, said trackway communicating with the bore of said sleeve, a slide disposed in said sleeve for movement along said trackway, said slide having one side face extending parallel to the incline of said trackway and another side face extending parallel to the axis of said sleeve, said other side face communicating with the sleeve bore and being adapted to engage and hold an article disposed in said sleeve, an abutment on said sleeve in alignment with the trackway and extending generally perpendicular to the incline of the trackway, said abutment being formed with a radially inwardly opening slot therethrough, an adjusting element threaded into said slide parallel to said trackway, said element being rotatably disposed through the slot and having a radial projection rotatably engaging said abutment on the side thereof adjacent said slide, said element being formed with a head projecting exteriorly of said slide on the opposite side of said abutment from the slide, whereby rotation of the element through said head may urge the slide away from the abutment into wedging engagement with the article received interiorly of the sleeve.

2. A chuck comprising a tubular sleeve formed interiorly with a trackway inclined to the major longitudinal axis of the sleeve in a common plane with said axis, a slide disposed in said sleeve for movement along said trackway, said slide having one side face extending parallel to the incline of said trackway and another side face extending parallel to the axis of said sleeve, said other side face communicating with the sleeve bore and being adapted to engage and hold an article disposed in said sleeve, an abutment on said sleeve in alignment with said slide and extending generally perpendicular to the incline of the trackway, said abutment being formed with a slot therethrough opening toward the interior of said tubular sleeve, an adjusting element threaded into said slide parallel to said trackway, said element being rotatably disposed through said slot and having a radial projection rotatably engaging said abutment on the side thereof adjacent said slide, said element being formed with a head projecting exteriorly of said slide on the opposite side of the abutment from said slide, whereby the said element may be rotated to urge the slide into wedging engagement with the article received interiorly of the sleeve.

References Cited in the file of this patent

UNITED STATES PATENTS

| | | |
|---|---|---|
| 711,911 | Smith | Oct. 21, 1902 |
| 1,552,104 | Zahner | Sept. 1, 1925 |
| 2,260,204 | Balz et al. | Oct. 21, 1941 |
| 2,468,195 | Hanes | Apr. 26, 1949 |
| 2,670,545 | Kaminski | Mar. 2, 1954 |